(12) United States Patent
Christiansen

(10) Patent No.: US 11,754,053 B2
(45) Date of Patent: Sep. 12, 2023

(54) ROTOR BLADE FATIGUE TESTING

(71) Applicant: Siemens Gamesa Renewable Energy A/S, Brande (DK)

(72) Inventor: Soeren Christiansen, Stoevenring (DK)

(73) Assignee: SIEMENS GAMESA RENEWABLE ENERGY A/S

( * ) Notice: Subject to any disclaimer, the term of this patent is extended or adjusted under 35 U.S.C. 154(b) by 0 days.

(21) Appl. No.: 17/063,969

(22) Filed: Oct. 6, 2020

(65) Prior Publication Data

US 2021/0108619 A1    Apr. 15, 2021

(30) Foreign Application Priority Data

Oct. 9, 2019 (EP) ..................................... 19202321

(51) Int. Cl.
*F03D 17/00* (2016.01)

(52) U.S. Cl.
CPC .......... *F03D 17/00* (2016.05); *F05B 2260/80* (2013.01)

(58) Field of Classification Search
CPC ... F03D 17/00; G01M 5/0066; G01M 5/0033; G01M 5/0041
See application file for complete search history.

(56) References Cited

U.S. PATENT DOCUMENTS

| 8,601,878 | B2* | 12/2013 | Cotrell | F03D 17/00 |
| | | | | 73/806 |
| 8,677,827 | B2* | 3/2014 | Cotrell | G01M 7/06 |
| | | | | 73/649 |
| 2010/0263448 | A1 | 10/2010 | Hughes et al. | |
| 2013/0061683 | A1* | 3/2013 | Baker | F03D 17/00 |
| | | | | 73/834 |
| 2016/0047707 | A1 | 2/2016 | Lee et al. | |

FOREIGN PATENT DOCUMENTS

| CN | 102156040 A | 8/2011 | |
| CN | 105190284 A | 12/2015 | |
| CN | 105466672 A | 4/2016 | |
| DE | 102012205153 B4 * | 10/2013 | .......... G01M 5/0016 |
| DE | 102013101241 A1 * | 8/2014 | .............. F03D 1/00 |
| DE | 102016005586 A1 * | 11/2017 | |
| EP | 2741068 A1 | 6/2014 | |
| EP | 2741069 A1 | 6/2014 | |
| EP | 3730916 A1 | 10/2020 | |
| KR | 20150119990 A * | 10/2015 | |
| KR | 20150119990 A | 10/2015 | |
| WO | 2009097049 A2 | 8/2009 | |
| WO | 2015126203 A2 | 8/2015 | |

\* cited by examiner

*Primary Examiner* — Courtney D Heinle
*Assistant Examiner* — John S Hunter, Jr.
(74) *Attorney, Agent, or Firm* — Schmeiser, Olsen & Watts LLP

(57) ABSTRACT

Provided is a method and an arrangement of fatigue testing of a wind turbine rotor blade, the method including: operating an actuator attached to the rotor blade, thereby moving a mass connected to the actuator in a reciprocating manner. The mass may be a hanging mass, for example, hanging down from the actuator.

14 Claims, 5 Drawing Sheets

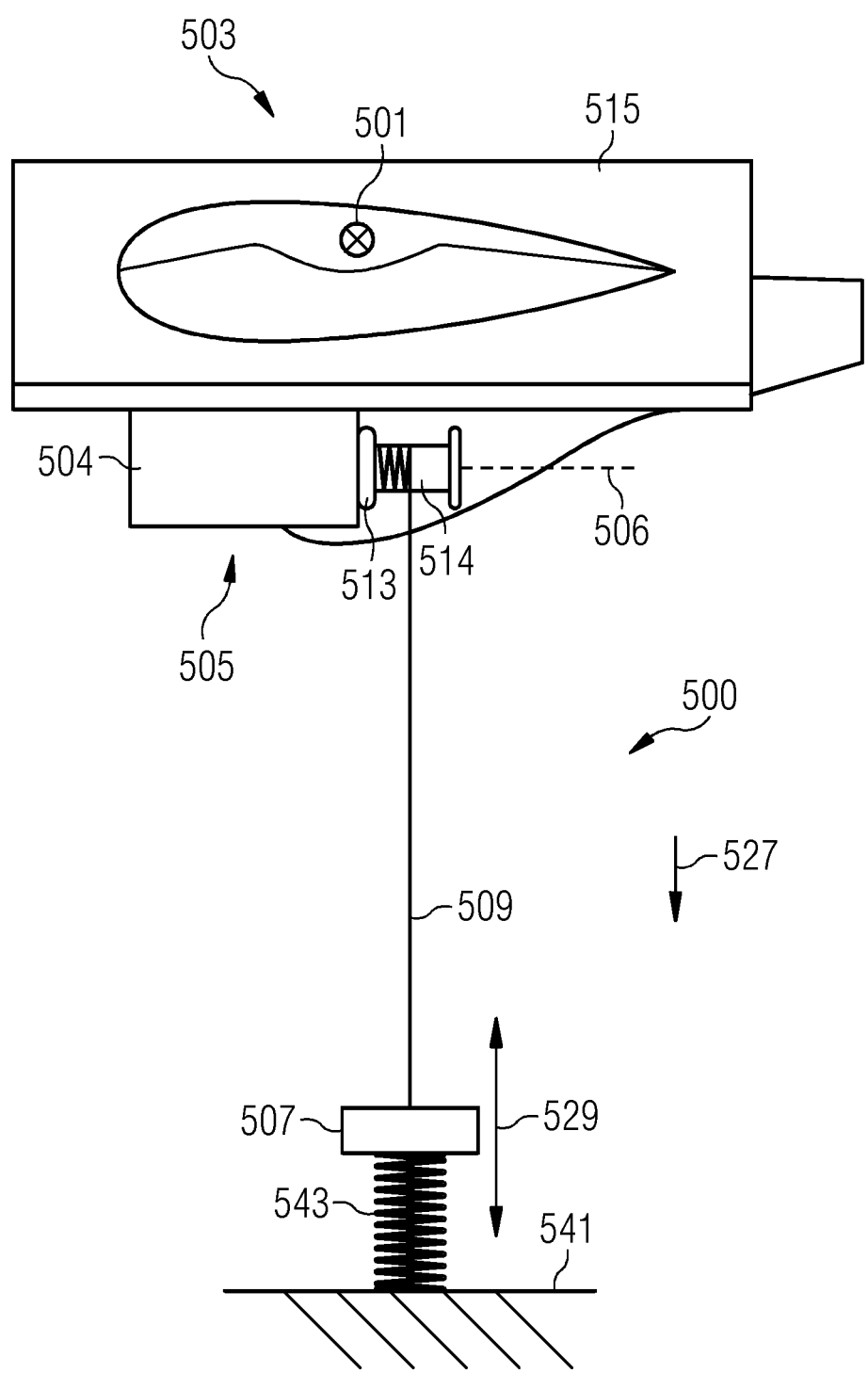

ROTOR BLADE FATIGUE TESTING

CROSS-REFERENCE TO RELATED APPLICATIONS

Figure 1:
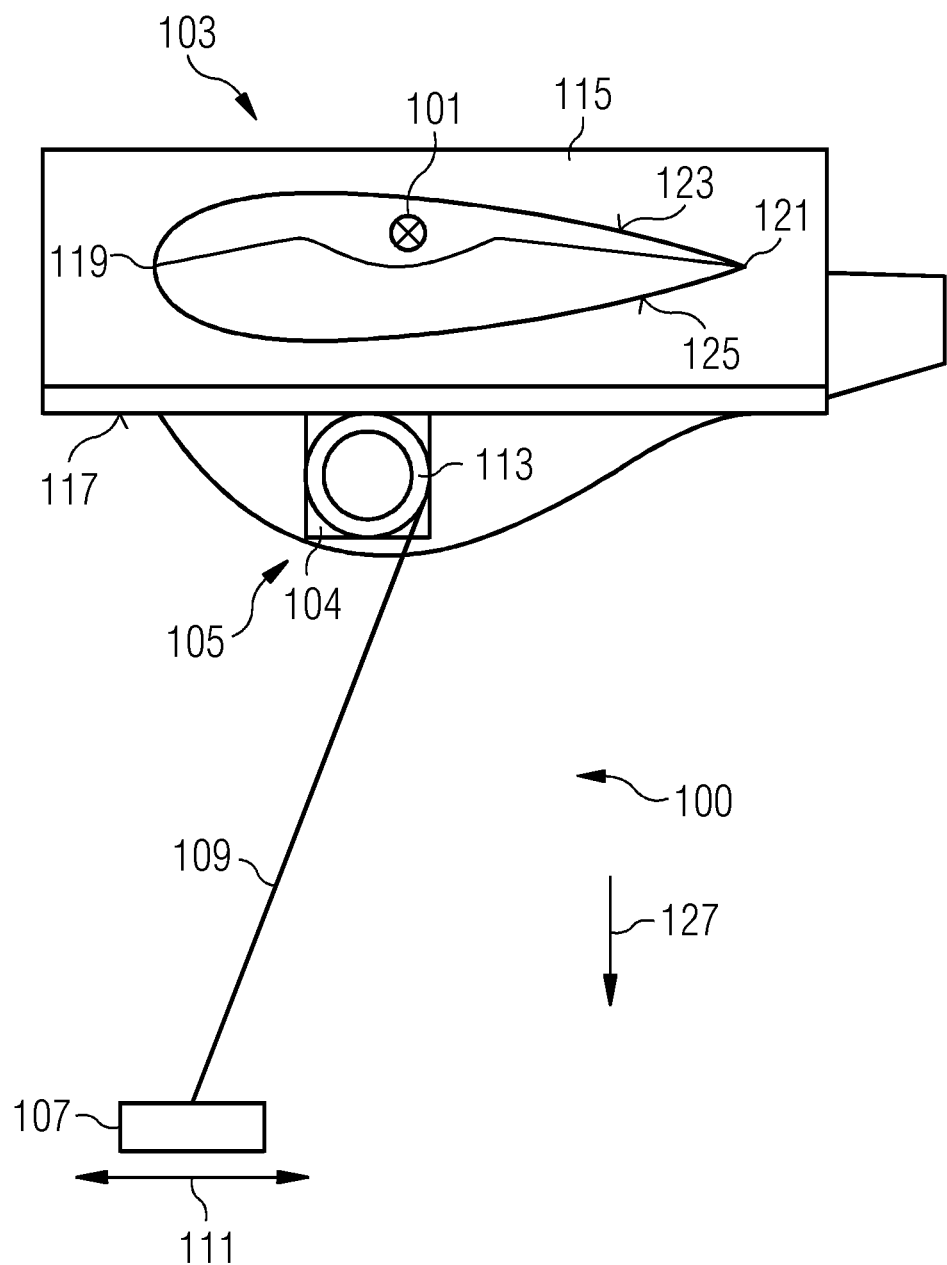

This application claims priority to European Application No. 19202321.6, having a filing date of Oct. 9, 2019, the entire contents of which are hereby incorporated by reference.

FIELD OF TECHNOLOGY

The following relates to a method of fatigue testing of a wind turbine rotor blade and further relates to an arrangement for fatigue testing of a wind turbine rotor blade.

BACKGROUND

In wind turbine blade fatigue testing, a wind turbine rotor blade is tested for stability of mechanical components during sustained or repetitive load application. Thereby, for wind turbine blade fatigue testing, conventionally, a ground-based exciter is used that is suspended between the rotor blade and the ground. The exciter has a movable part that can for example move up and down with a particular stroke length. The movable part is somehow connected to the blade such that the rotor blade is moved when the exciter moves the movable part. Thereby, the blade stroke length, i.e. the distance by which the blade is moved due to the movement of the movable part, is equal to the exciter stroke length. In different fatigue tests, different blade stroke lengths may be desired.

EP 2 741 069 discloses a ground-based spring excited test rig system, wherein the exciter is placed on the ground and the rotor blade is excited by a connecting wire from the exciter.

A problem of the conventional method is that most actuators are most efficient at a certain stroke length which for example applies to hydraulic and electrical motors. Hydraulics for example are designed for a certain amount of oil to be pumped to which an associated stroke length is related. Electrical motors are most efficient at a certain rotational speed which may be translated into a stroke length at a certain frequency and shaft radius. For optimizing blade fatigue testing, smaller blade strokes at the exciter location are desired which means that the radius of the motor shaft radius has to be extremely small. Therefore, conventionally, a gearing has been used which may handle reversals or the problem may be solved by separating the exciter stroke length from the blade stroke length. However, the exciter has a relatively high price. Further, the conventional ground-based exciter uses a push rod between the exciter and the blade. This push rod may have a considerable length such as at least 12 m and which must be configured to withstand and transfer big forces. Furthermore, a gearbox and motors are also expensive parts.

Conventionally, a motor, a gearbox and a push rod have been utilized for wind turbine blade fatigue testing. Thereby, often gearbox reversals have been accepted which, however, involves high loads and wear of the gearbox causing it to deteriorate after a relatively short period of operation time. Further, conventionally, the ground-based exciter has been designed for small forces at high speed and thus, the exciter had to be placed relatively close to the tip end of the blade. Placing the exciter relatively far out on the blade, i.e. relatively close to the blade tip, may have caused a less optimal test result. Designing the blade fatigue testing such that the exciter closer to the root excites reciprocating movements or oscillations of the blade would significantly approve the test result, but would require a more expensive exciter, because the required forces to excite the blade at an exponentially smaller amplitude would be exponentially bigger.

Thus, there may be a need for a method of fatigue testing of a wind turbine rotor blade and further there may be a need for a corresponding arrangement for fatigue testing of a wind turbine rotor blade which at least partly overcomes the aforementioned problems. The need may be solved by the subject-matter of the independent claims. The dependent claims specify particular embodiments of the present invention.

SUMMARY

According to an embodiment of the present invention it is provided a method of fatigue testing of a (in particular disassembled from the wind turbine rotor or hub) wind turbine rotor blade, the method comprising: operating an actuator attached to (and in particular moving with) the blade, thereby moving a mass connected to the actuator in a reciprocating manner.

The method may be suitable for testing wind turbine rotor blades having a length between for example 10 m and 100 m. The fatigue testing may evaluate the mechanical stability of several portions of the wind turbine rotor blade. Thereby, the method of fatigue testing may simulate or at least approximate loads which occur during normal operation of the wind turbine involving forces acting on the rotor blade by the wind.

The actuator may for example comprise hydraulics and/or a motor, in particular an electric motor. The actuator may be attached to any location or position of the rotor blade along a longitudinal direction. For example, the actuator may for example be attached relatively close to a root, in a middle portion or relatively close to the tip of the rotor blade. Depending on the position along the longitudinal axis of the rotor blade, a stroke power of the actuator or rotational speed or torque of the actuator and/or the value of the mass may be appropriately selected, in order to allow generation of a suitably high force in order to excite or cause a movement, in particular oscillating movement of the rotor blade. Depending on the application, the method of fatigue testing may be conducted such that the actuator may be placed successively at different positions along the longitudinal direction, for example to test different portions of the wind turbine rotor blade or evaluate the integrity or quality at different portions of the wind turbine rotor blade. During the fatigue testing, the actuator attached to the blade may move synchronously with the blade. Thus, the actuator is not a ground-based actuator which is, as is conventionally known, in a stationary position while the blade is excited for oscillating movements. When the actuator is for example an (electric) motor, a chassis or casing comprising a stator portion of the motor may be attached to the rotor blade, while the rotor is allowed to rotate relative to the stator portion. In this case, the rotation of the rotor of the motor is not impeded by the attachment of the actuator to the rotor blade. The actuator may be attached to the blade using any mounting means or mount, such as a frame, a clamp, bolts, etc.

The mass may be a compact, for example metal, structure which may hang down from the actuator and also down from the wind turbine blade. For example, the mass may be connected to the actuator (for example connected to a rotor of a motor as an example of an actuator) by a flexible or bendable or deformable material, such as a rope, a wire, a band, a string or the like or a combination thereof. When the mass is caused to move in a reciprocating manner, a corresponding reciprocating movement of the blade will be excited, in particular involving oscillations of the rotor blade. The method does not necessarily require any gearbox but may optionally comprise a gearbox. Thus, gearbox reversals can be avoided by the method. Furthermore, a high exciting force may be adjusted by appropriately selecting the value of the mass and the value of the exciting force of the actuator, in particular involving adjustment of torque and/or rotational speed of a motor or the like. Thus, also a fatigue testing may be performed relatively close to a root of the rotor blade requiring relatively high excitation forces. Therefore, also the fatigue testing results may be improved. Furthermore, the method requires a relatively simple and cost-effective equipment.

According to an embodiment of the present invention, operating the actuator causes the mass to move up and down and/or to move side by side. When the mass is caused to move up and down in a reciprocating manner or oscillating manner, for example flapwise oscillations of the rotor blade may be excited when the actuator is for example attached on a suction side or a pressure side of the wind turbine blade and the pressure side or the suction side is substantially oriented horizontally. When the mass is caused to move side by side in a reciprocating manner, for example edgewise oscillations of the rotor blade may be excited. Thus, high flexibility is provided for performing differently designed fatigue testing of a wind turbine rotor blade.

According to an embodiment of the present invention, the movement of the mass causes excitation of a flapwise oscillation and/or an edgewise oscillation of the blade. In particular, by appropriately adjusting actuator operation, any eigenfrequency of any oscillation mode of the rotor blade may be excited. Furthermore, any combination of different excitation modes may be applied in order to excite any desired combination of rotor blade oscillations. Therefore, conventional fatigue testing methods may be supported.

According to an embodiment of the present invention, the mass is connected to the actuator via a bendable holding material that is tightened by the gravitational weight of the hanging mass. The bendable holding material may be the structure which connects the mass to the actuator, for example in particular a rotor of a motor as an example of an actuator. The bendable holding material may be rollable and unrollable around a bar or a pipe or a shaft. Thereby, it is enabled to convert a rotational movement for example of a rotatable part of the actuator (for example a rotor of a motor) into a linear movement which is then transferred to the mass. When the mass hangs from the actuator by the gravitational weight, the bendable holding material may be straightened. Thus, in particular, this fatigue testing method does not require a cost-intensive push rod as was required in conventional methods. The bendable holding material may be implemented in different forms, such as a string, a wire, a rope which is conventionally available equipment, and which is cost-effective.

According to an embodiment of the present invention, the actuator is configured to generate a reciprocating torque at a rotatable part to effect a reciprocating rotational movement of the rotatable part. The actuator may be implemented for example including a hydraulic system which may be configured to generate a torque or may for example implemented as a motor, in particular an electric motor. These implementations comprise a rotatable part at which a torque is applied to effect the reciprocating rotational movement of the rotatable part. Thereby, a simple implementation of the actuator is provided.

According to an embodiment of the present invention, the actuator drives a conversion equipment to convert a reciprocating rotational movement of a rotatable part into a reciprocating linear movement of the mass. The conversion equipment may for example be realized by the bendable holding material which is rolled and unrolled around a portion of the rotor or a rod od shaft connected thereto. In another embodiment, the conversion equipment may be realized by for example a cranked shaft and a corresponding connecting rod as is used in a combustion engine of an automobile.

According to an embodiment of the present invention, the actuator comprises an electric motor, in particular AC motor, having a rotor, wherein the mass is connected at a bendable rope and/or string and/or band and/or belt and/or wire connected to the rotor, wherein a stator portion of the motor is attached to the blade. The AC motor may for example be a synchronous electrical machine having permanent magnets or having electromagnets. The AC motor may be controlled regarding its rotational speed by a particular driver circuit, for example involving a converter capable of providing AC currents of desired frequency. The frequency converter may be controlled by speed or by torque.

Using the bendable rope and/or string and/or band and/or belt and/or wire (examples of a bendable holding material) in conjunction with the rotor or a bar connected to the rotor enables the conversion of the rotational movement into a linear movement. Thereby, a reciprocating linear movement of the mass may be easily generated by operating the electric motor.

According to an embodiment of the present invention, during operating the motor the rope is reciprocatingly at least partly coiled around a bar comprised in or connected to the rotor of the motor and at least partly unrolled from the bar. When the rope (or in general the bendable holding material) is partly coiled around the bar, the distance between the actuator and the mass may be decreased involving lifting the mass upward. When the rope or in general bendable holding material is partly unrolled from the bar, the distance between the actuator and the mass may be increased involving lowering the mass (in the gravitational field of the earth). Thereby, the linear movement is achieved in a simple manner from the rotational movement of the rotor of the electric motor.

According to an embodiment of the present invention, at the rotor of the motor a flywheel is connected and/or at the rotor of the motor one end of a (e.g. torsion) spring is connected, wherein another end of the spring is connected to the blade.

A flywheel may comprise a rotationally symmetric structure or material which is connected to the rotor such that the rotational symmetry axis of the flywheel is aligned or coinciding with the axis of the rotor. When the flywheel is rotating (together with the rotor of the motor), the flywheel may store considerable rotational energy. Thereby, action of the motor may be supported or supplemented. Similarly, the spring may be twisted when the rotor rotates thereby causing build-up of an opposite torsion force of the spring. When the torque acting on the rotor is diminished or adjusted to zero, the opposite torsion force of the spring may decelerate the rotation of the rotor and may even cause rotation of the rotor in an opposite direction. Thereby, also the back and forth movement of the rotor may be supported or supplemented by the action of the spring.

According to an embodiment of the present invention, the blade is arranged such that a longitudinal axis of the blade is substantially horizontally oriented, wherein the actuator is attached at a side of the blade facing the center of the earth.

In particular, an upstream edge and a downstream edge of the rotor blade may substantially lie in a horizontal plane. It should be understood that the specification "horizontally oriented" is defined by a plane perpendicular to the local direction of the gravitational force of the earth. The suction side and/or the pressure side of the rotor blade may substantially lie in two different horizontal planes. Thereby, conventional fatigue testing configurations may be supported.

According to an embodiment of the present invention, the mass is connected to a ground via a spring, in particular spiral spring. The spring connected to the ground may allow to adjust an effective weight of the mass. For example, by adjusting or selecting a spring bias, the spring may decrease the effective value of the mass by holding a part of the weight of the mass. Thus, for example, without changing the mass, by changing the bias of the existing string or replacing a first string with a second string (having different spring constant), the effective excitation force for exciting rotor blade oscillation may be adjusted. Thereby, the method may still further be simplified and conducted in a flexible manner.

According to an embodiment of the present invention, a container holding a liquid is connected to the mass for damping an undesired movement of the mass. The liquid may comprise water or a liquid with higher viscosity than that of water. When for example the mass is unintentionally also excited in a side-side movement, the liquid within the container may damp this undesired movement.

According to an embodiment of the present invention, the mass is connected to the actuator via a gearbox. A gearbox is not a mandatory feature of embodiments of the present invention, but may occasionally be advantageous, in order to for example transfer the rotational speed of the motor to a different rotational speed of a secondary shaft of the gearbox (having for example a primary shaft connected to the rotor of the motor). Thereby, several different or desired particularities of the fatigue test may be realized.

It should be understood, that features, individually or in any combination, disclosed, described, applied or provided for a method of fatigue testing of a wind turbine rotor blade may also, individually or in any combination, be applied to an arrangement for fatigue testing of a wind turbine rotor blade according to embodiments of the present invention and vice versa.

According to an embodiment of the present invention it is provided an arrangement for fatigue testing of a wind turbine rotor blade, the arrangement comprising: an actuator attachable to the blade; and a mass connected to the actuator, wherein the actuator is operable to move the mass in a reciprocating manner.

Furthermore, the arrangement may comprise a bendable holding material (such as a rope, a wire, a string, a band, or a combination thereof) connecting the mass to the actuator.

The arrangement may be configured to carry out a method of fatigue testing according to an embodiment of the present invention. The method of fatigue testing of a wind turbine rotor blade according to an embodiment of the present invention may be implemented using the arrangement for fatigue testing of a wind turbine rotor blade.

BRIEF DESCRIPTION

Figure 2:
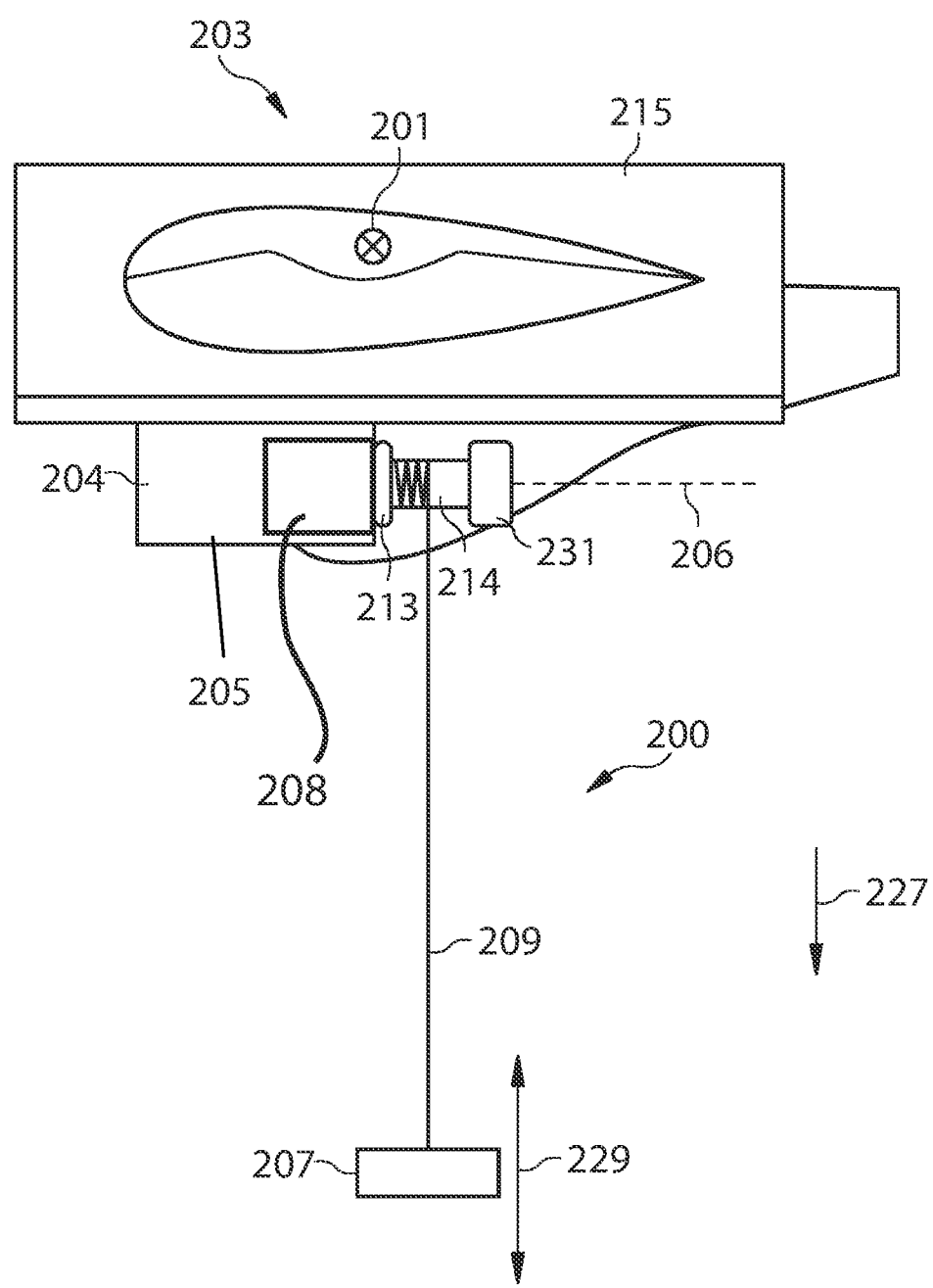
Figure 3:
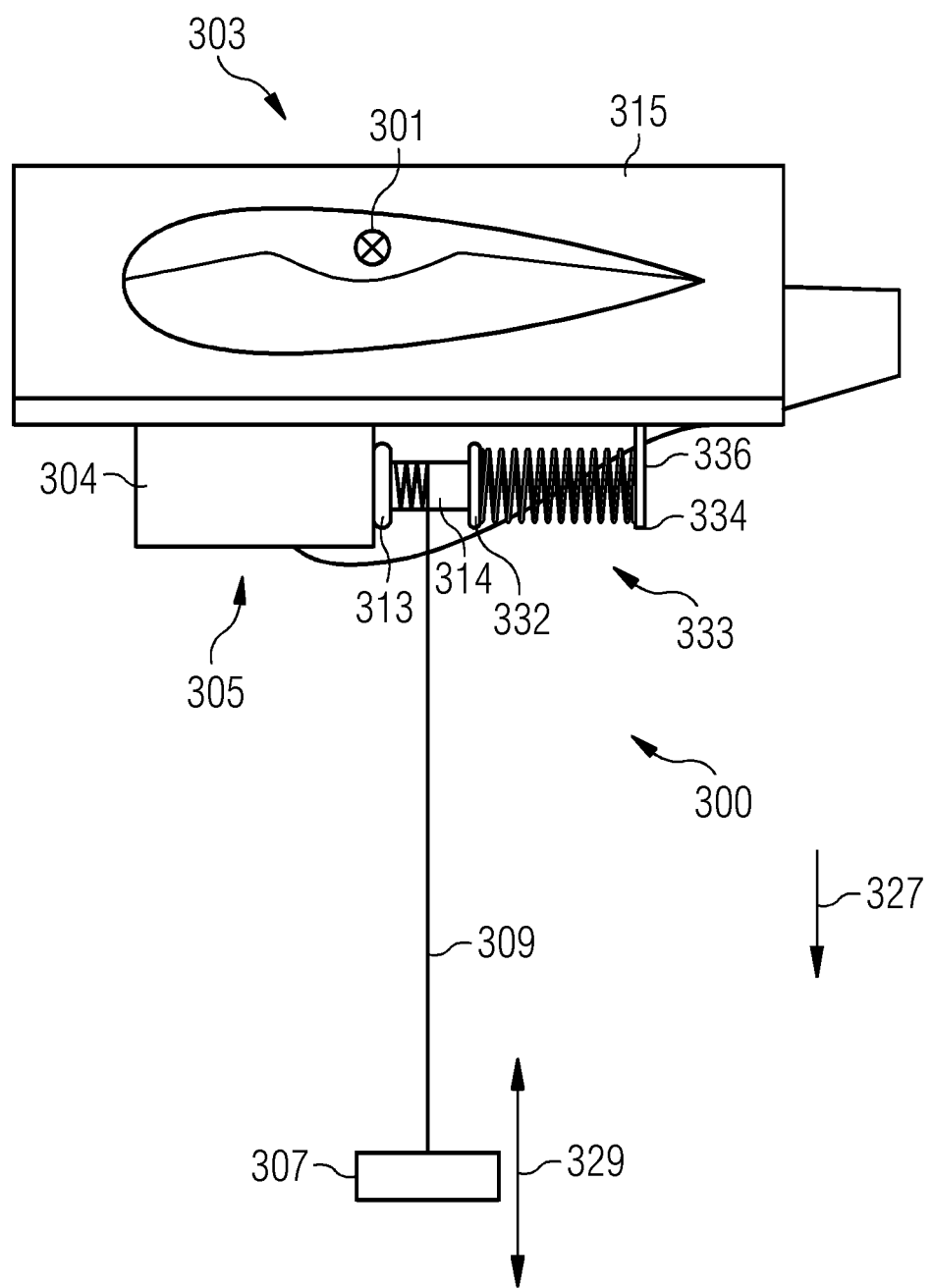
Figure 4:
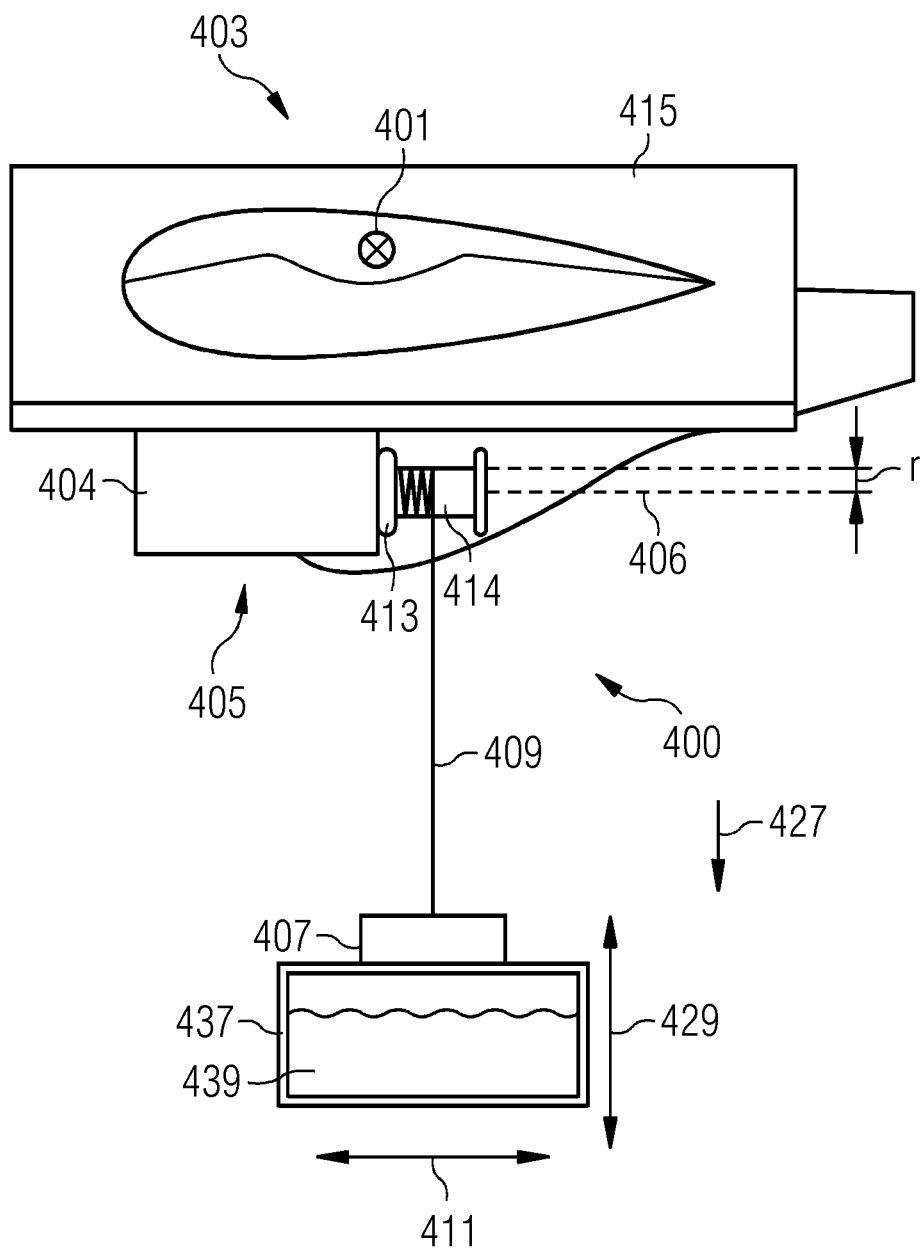

Some of the embodiments will be described in detail, with references to the following Figures, wherein like designations denote like members, wherein:

FIG. 1 schematically illustrates an arrangement for fatigue testing of a wind turbine rotor blade;

FIG. 2 schematically illustrates an arrangement for fatigue testing of a wind turbine rotor blade;

FIG. 3 schematically illustrates an arrangement for fatigue testing of a wind turbine rotor blade;

FIG. 4 schematically illustrates an arrangement for fatigue testing of a wind turbine rotor blade; and FIG. 5 schematically illustrates an arrangement for fatigue testing of a wind turbine rotor blade.

DETAILED DESCRIPTION

The illustration in the drawings is in schematic form. It is noted that in different figures, elements similar or identical in structure and/or function are provided with the same reference signs or with reference signs, which differ only within the first digit. A description of an element not described in one embodiment may be taken from a description of this element with respect to another embodiment.

The FIG. 1 to FIG. 5 each schematically illustrate different embodiments of an arrangement for fatigue testing of a wind turbine rotor blade, wherein the rotor blade to be tested is also schematically illustrated. The rotor blade and the arrangement for fatigue testing is depicted in a view along a longitudinal axis 101 of the rotor blade 103.

The arrangement 100 for fatigue testing as illustrated in FIG. 1 comprises an actuator 105 (implemented as a motor) which is attached to the rotor blade 103. The arrangement 100 further comprises a mass 107 which is connected to the actuator 105 in particular by a bendable holding material 109 which is implemented for example as a string, a wire, a rope, or the like. bendable holding material 109 may have a length between 5 m and 20 m. The actuator 105 is operable to move the mass 107 in a reciprocating manner. In FIG. 1, the arrangement 100 is configured to move the mass in a side-side oscillation movement as depicted by the arrows 111. Thereby, the motor 105 is operated to rotate back and forth exciting a pendulum movement of the mass 107 as the rope 109 is connected to a rotating part 113 of the motor 105. In particular, the rotating part 113 (or a part connected to it) may optionally comprise a flywheel in order to support the reciprocating movement of the rotating part 113 of the motor 105. The actuator comprises a stator part 104 that is attached to the blade 103.

In all the embodiments depicted in FIGS. 1 to 5, the actuators 105 to 505 is attached to the rotor blade 103 via a frame or clamp structure 115 which may at least partly surround the rotor blade 103 and provide a mounting surface 117 at which the actuators 105 to 505 may be mounted. The frame or clamp structure 115 may be attachable at any position along the longitudinal axis 101 of the rotor blade in order to allow performing fatigue testing procedure in different configurations. According to other embodiments, the actuator may be attached by other means to the rotor blade involving any other mounting equipment.

It should be noted that the axis of the rotatable part 113 (the rotor) of the motor 105 is parallel to the longitudinal axis 101 of the rotor blade 103. Thereby, by moving the mass 107 along the arrows 101, edgewise oscillation of the rotor blade 103 may be excited.

In particular, the rotor blade 103 comprises a leading edge 119 and a trailing edge 121. Further, the rotor blade 103 comprises a suction side surface 123 and a pressure side surface 125. The leading edge 119 and the trailing edge 121 substantially lie in a horizontal plane perpendicular to the direction 127 of the gravitational force of the earth.

The arrangement 200 for fatigue testing illustrated in FIG. 2 also comprises as an actuator a motor 205. However, the axis 206 of the rotatable part (i.e. the rotor) 213 lies within the drawing plane thus being perpendicular to the longitudinal axis 201 of the rotor blade 203. The mass 207 is connected to the rotatable portion 213 (i.e. the rotor of the motor 205) by the rope or wire or string 209 which is partly coiled around a bar 214 comprised in the rotor 213. By rotating the rotor 213, more or less of the rope 209 is coiled around the bar 214 thereby causing an up and down movement along the arrows 229, i.e. along the direction 227 of the gravitational force. Furthermore, at the rotor 213, a flywheel 231 is attached providing additional inertia for supporting action of the motor 205. The flywheel 231 is optional and may be suspended with in other embodiments. In embodiments, the mass 207 may be connected to the actuator via a gearbox 208.

The arrangement 300 for fatigue testing is similar to the arrangement 200 illustrated in FIG. 2 but comprises instead (or additionally) to the flywheel 231 a spring 333 which is connected at the rotor at one end 332. At another end 334, the spring is connected via a bar 336 to the frame structure 315 which in turn is connected to the rotor blade 303.

The arrangement 400 illustrated in FIG. 4 has similarity with the arrangement 200 illustrated in FIG. 2, however, the flywheel is not present. However, additionally to the embodiment illustrated in FIG. 2, a container 437 holding a liquid 439 is present which is connected to the mass 407 for damping an undesired movement of the mass 407. Thereby, an up and down movement along the arrows 429 is still enabled, while a side-side movement along the arrows 411 is damped. Thereby, a flapwise oscillation of the rotor blade may be excited but an edgewise oscillation may by damped. The radius r of the rotatable portion 413 (onto which the holding string may be rolled and unrolled) may appropriately be selected to achieve a desired transmission ratio of rotation versus linear movement.

The embodiment 500 illustrated in FIG. 5 has similarity with the embodiment of FIG. 4, however, the liquid container is omitted, but the mass 507 is connected to a ground 541 via a spring 543 which is in particular a spiral spring. Therefore, a portion of the gravitational weight of the mass 507 may be carried by the spiral spring 543.

As can be seen in FIGS. 1 to 5, the bendable holding material 109-509 is tightened by the gravitational weight of the hanging mass 107-507. The motor is configured to generate a reciprocating torque at the rotatable portion 113-513 to effect a reciprocating rotational movement of the rotor of the motor. As can also be appreciated from FIGS. 1 to 5, a stator portion of the rotor is attached to the blade 103-503 via the frame 115-515. As can also be appreciated from FIGS. 1 to 5, the longitudinal axis 101-501 of the blade 103-503 is substantially oriented horizontally, i.e. perpendicular to the direction of the gravitational force 127-527. The actuator 105-505 is attached at the pressure side 125-525 of the blade. In other embodiments, the rotor blade 103 may be flipped such that the actuator may be attached at the suction side 123. In still other embodiments, the actuator may be attached to or at the side of the leading edge 119 or the trailing edge 121. Still in other embodiments, two or more actuators or electric motors may be attached to the blade at different longitudinal or lateral positions of the rotor blade.

According to an embodiment of the present invention, the rotor blade may be excited using a standard relatively cost-effective AC electric motor which may have a pulley with a mass attached with a rope. The rotor blade may be excited by pulling the mass up and down near/at the eigenfrequency of the rotor blade. This may cause the rotor blade to oscillate. To keep the mass oscillating a spring/flywheel (see for example FIG. 3 or 2) or both may be added. The spring/flywheel may preserve the motion while the motor slowly increases the oscillation. The mass may also be placed on a spring (see for example FIG. 5) on the ground to reduce the static mass. Also, to prevent the mass from oscillating sideways, a liquid damper (see FIG. 4) may be provided. The motor may pull the mass up and down while reaching nominal rotational speed. The force may be adjusted by changing the mass and/or by changing the rotor rotational speed or motor rotational speed. The exciter (motor) may also work for edgewise fatigue testing (see for example FIG. 1). If the blade is excited at the edge frequency, the blade may eventually start to oscillate edgewise as a pendulum.

Below, some equations are given explaining a basic concept how the blade may be caused to oscillate:

$$I dd\theta/ddt + K\theta = M\_motor + M\_mass(x) \quad (1)$$

where
θ is the shaft angle,
I is the inertia of the shaft (e.g. 213, 214 in FIG. 2) and flywheel (e.g. 231 in FIG. 2).
K is the spring stiffness (e.g. of spring 333 in FIG. 3),
M_motor is the motor torque; and
M_mass is to torque from the suspended mass (e.g. of mass 207 in FIG. 2) at position x, $$M\_mass(x) = r*F\_mass(x) \quad (2)$$

where
r is the pully radius (see FIG. 4) and
F_mass(x)=m*a(x) where m is the mass and a is the acceleration of the mass, which depends on the position x.

The blade (e.g. 103) will see a force from the load thus:

$$Mb\ ddx/ddt + Bb\ dx/dt + Kb\ x = F\_mass(x) + M\_motor/r \quad (3)$$

where
Mb is equivalent blade mass,
Bb is equivalent damping,
Kb is equivalent stiffness.

If a force force, e.g. a sinusoidal force, is applied to the motor torque, M_motor, then the blade will start to oscillate.

The pulley radius r is indicated for example in FIG. 4.

The above equation merely sketch roughly the basic concept how to excite the blade and what may cause the blade to move. However, other equations may be applicable to describe the motion or oscillation of the blade due to the action of the actuator in detail.

Some advantages of embodiments of the present invention are listed below:

The arrangement for fatigue testing may excite the rotor blade near the root at a relatively low purchase price. Conventional exciters require a large gearing to produce a small stroke, thus gearbox reversals would increase. The embodiments do not require a gearbox thereby also omitting gearbox reversals.

Since there are no mandatory gearbox reversals, the motor shaft does not have to be of low inertia as an expensive servomotor. Further, a cheap standard AC motor may be used. Further, no expensive push rod as required by conventional methods, is required, because the proposed exciter is blade-mounted and may use a cheap rope instead of a push rod.

The blade stroke may be separated from the exciter stroke. Therefore, the electric motor may reach nominal rotational speed. The exciter (or the actuator) may be placed relatively close to the root of the rotor blade and still may be run at a nominal rotational speed.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of fatigue testing of a wind turbine rotor blade, the method comprising:
    exciting the wind turbine rotor blade,
    wherein exciting the wind turbine blade includes operating an actuator attached to the wind turbine rotor blade, thereby moving a mass connected to the actuator in a reciprocating manner, wherein the mass is a hanging mass hanging down from the actuator by a bendable rope, a string, a band, a belt, and/or a wire, wherein the actuator comprises an electric motor, having a rotor, wherein the bendable rope, the string, the band, the belt, and/or the wire is connected to the rotor, wherein a stator portion of the electric motor is attached to the wind turbine rotor blade, and wherein during operating of the electric motor the bendable rope, the string, the band, the belt, and/or the wire is at least partly coiled around a bar and at least partly unrolled from the bar in the reciprocating manner.

2. The method according to claim 1, wherein the movement of the hanging mass causes excitation of at least one of a flapwise oscillation and an edgewise oscillation of the wind turbine rotor blade.

3. The method according to claim 1, wherein the bendable rope, the string, the band, the belt, and/or the wire is tightened by a gravitational weight of the hanging mass.

4. The method according to claim 1, wherein the actuator is configured to generate a reciprocating torque at a rotatable part to effect a reciprocating rotational movement of the rotatable part.

5. The method according to claim 1, wherein the actuator drives a conversion equipment to convert a reciprocating rotational movement of a rotatable part into a reciprocating linear movement of the hanging mass.

6. The method according to claim 1, wherein at least one of: at the rotor of the motor a flywheel is connected; and at the rotor of the motor one end of a spring is connected, wherein another end of the spring is connected to the wind turbine rotor blade.

7. The method according to claim 1, wherein the wind turbine rotor blade is arranged such that a longitudinal axis of the blade is horizontally oriented, wherein the actuator is attached at a side of the wind turbine rotor blade facing down.

8. The method according to claim 1, wherein the hanging mass is connected to a ground via a spring wherein the spring is a spiral spring.

9. The method according to claim 1, wherein a container holding a liquid is connected to the hanging mass for damping an undesired movement of the hanging mass.

10. The method according to claim 1, wherein the hanging mass is connected to the actuator via a gearbox.

11. An arrangement for fatigue testing of a wind turbine rotor blade, the arrangement comprising:
    an actuator attachable to the wind turbine rotor blade; and
    a hanging mass connected to the actuator by a bendable rope, a string, a band, a belt, and/or a wire,
    wherein the actuator is operable to move the hanging mass in a reciprocating manner, wherein the actuator comprises an electric motor, having a rotor, wherein the bendable rope, the string, the band, the belt, and/or the wire is connected to the rotor, wherein a stator portion of the electric motor is attached to the wind turbine rotor blade, and wherein during operating of the electric motor the bendable rope, the string, the band, the belt, and/or the wire is at least partly coiled around a bar and at least partly unrolled from the bar in the reciprocating manner.

12. The arrangement according to claim 11, further comprising:
    the bendable rope connecting the hanging mass to the actuator.

13. An arrangement for fatigue testing a wind turbine rotor blade, the arrangement comprising:
    an actuator attached to the wind turbine rotor blade by a frame or clamp structure, the actuator including a motor comprising a rotatable portion; and
    a hanging mass connected to the rotatable portion by a rope, a string, and/or a wire, wherein the actuator is operable to move the hanging mass in a reciprocating manner; and
    a flywheel.

14. The arrangement according to claim 13, wherein the rope, the string, and/or the wire are at least partly coiled around the rotatable portion.

* * * * *